Figure 2:
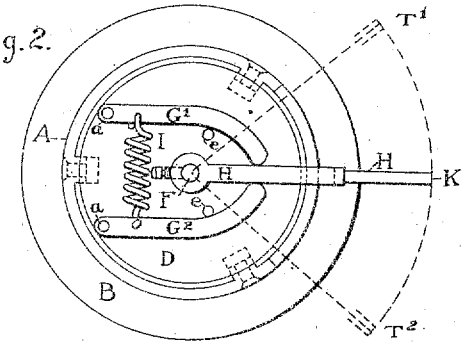

No. 11,718.

Reissued Feb. 21, 1899.

O. H. & A. F. PIEPER.

ELECTRICAL CONTROLLING APPARATUS.

(Application filed Jan. 17, 1899.)

Witnesses.

G. Willard Rich

G. A. Roda.

Inventors

Oscar H. Pieper

Alphonse F. Pieper by Chuck & Chuck their Attorneys.

UNITED STATES PATENT OFFICE.

OSCAR H. PIEPER AND ALPHONSE F. PIEPER, OF ROCHESTER, NEW YORK.

ELECTRICAL CONTROLLING APPARATUS.

SPECIFICATION forming part of Reissued Letters Patent No. 11,718, dated February 21, 1899.

Original No. 575,573, dated January 19, 1897. Application for reissue filed January 17, 1899. Serial No. 702,477.

*To all whom it may concern:*

Be it known that we, OSCAR H. PIEPER and ALPHONSE F. PIEPER, citizens of the United States, and residents of Rochester, in the county of Monroe and State of New York, formerly residing at San José, county of Santa Clara, and State of California, have invented certain new and useful Improvements in Controlling Apparatus for Electric Motors; and we hereby declare the following specification and the drawings therewith to be a complete description of our improvements, with the manner of their construction and operation.

Our invention relates to devices for controlling electric motors, especially those employed to operate dental apparatus, and to stopping, starting, reversing, and controlling the speed of such motors by means of a pedal and oscillating switch-bar analogous to, in some respects, and an improvement on the invention described in Letters Patent No. 541,500, granted to us on the 25th day of June, 1895, for improvements in electrical controlling apparatus.

Our present improvements consist in improved mechanism for automatically adjusting the pedal and switch mechanism to its central or neutral position and to an improved arrangement of the rheostat elements for stopping, starting, and reversing the motor, also for arresting suddenly its momentum when revolving in either direction by utilizing said momentum to perform work and thereby arresting its motion.

Our invention consists in various mechanical and electric devices and their arrangement, as shown in the drawings and set forth in the claims at the end of this specification.

The objects of our improvements are a more efficient and sudden control of electric motors employed in dental operations, in which such control is desirable and essential for many kinds of operations.

Figure 1:
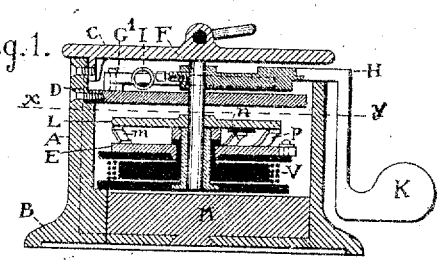
Figure 3:
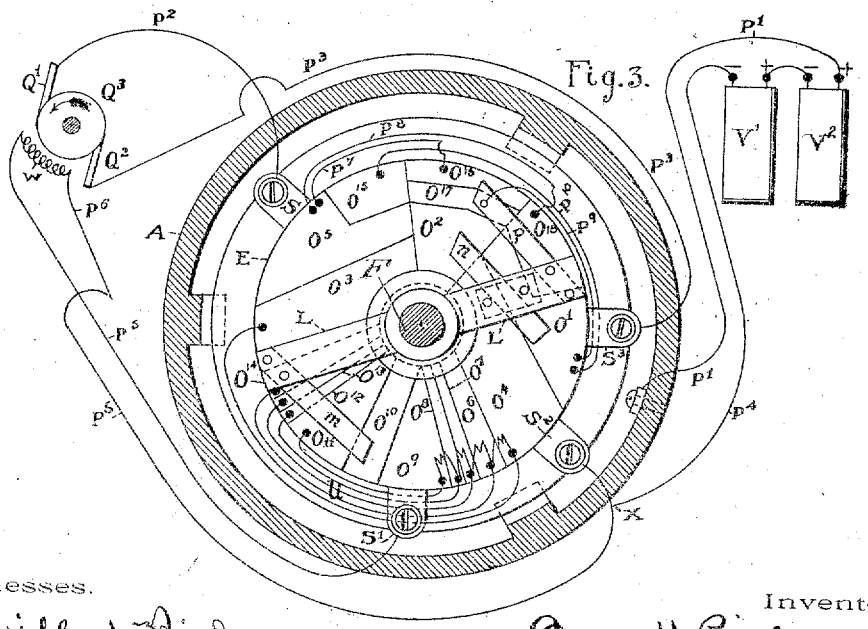

In the drawings, Figure 1 is a central vertical section through a controlling apparatus made according to our invention; Fig. 2, a whole plan view of Fig. 1 with the top cover removed; Fig. 3, an enlarged plan on the line *x y* of Fig. 1.

Similar letters of reference are employed to designate like parts in the different figures of the drawings.

The main containing-case A is preferably made of metal, with a projecting base B, adapted to stand on the floor, a mass M being added to increase the weight and thus resist by friction the turning strain of the foot-pedal K. In the center is a partially revolving or oscillating spindle F, to the top of which is attached a lever H, formed integrally with the pedal K, movable to the right or left through an arc, as indicated at $T'$ $T^2$ in Fig. 2.

When the pedal K and lever H are moved to the right or left the motor $Q^3$ is, by reason of electrical functions to be hereinafter explained, started in either direction accordingly, and when the pedal K is released the lever H is at once moved to its central or neutral position by means of the jaws $G'$ $G^2$, operated by the coil-spring I, as seen in Fig. 2.

The jaws or levers $G'$ $G^2$ are pivoted at *a a* and rest against stop-pins *e e*, also against the lever H, as seen in Fig. 2, so that when either of the jaws $G'$ or $G^2$ are moved by the lever H the other jaw remains stationary, the spring I acting for either motion and returning the lever H, when released, to its central position.

The lever or pedal K can be provided with stops or locking devices to hold it at any desired point in its range; but such devices not forming a part of our present invention are not included in the drawings herewith.

On the stem F is fixed a switch-bar L, provided with brushes *m*, *n*, and *p*, that connect with and transfer current to various contact-plates in the system designated O, with numerals from "1" to "18," connected by means of wires marked with the letter P and numerals "1" to "10," as will appear hereinafter.

Brush *n* is insulated from switch-bar L and brushes *m* and *p* are in direct contact therewith.

$V'$ and $V^2$ are cells of an electric battery to supply current, and $Q^3$ the armature or commutator of an electric motor having brushes $Q'$ $Q^2$ and main connecting-wires $P^2$ and $P^3$, as seen in Fig. 3.

We will now proceed to describe the course of the electric current when the bar L is in the position corresponding to that indicated at $T^2$ in Fig. 2 or an intermediate position from the center toward $T^2$ and to operate the motor $Q^3$ in the direction of the arrow thereon. In this position of the various elements current from the battery $V'$ $V^2$ passes from the positive poles of the battery $V'$ $V^2$, through the wire $P'$ to the main case A, through the stem F, bar L, and brush $p$ to the plate $O^{18}$, then from the plate $O^{18}$ through the wire $P^8$ to plate $O^5$ and the binding-post S, and through the wire $P^2$ to the brush $Q'$ of the armature $Q^3$; then through the armature $Q^3$ to the brush $Q^2$, through the wire $P^3$ to the binding-post $S^3$; thence to plate $O'$ and across the brush $n$, which is insulated from bar L, to plate $O^4$; thence to the binding-post $S^2$ and returns to the negative poles of the battery $V'$ $V^2$ by the wire $P^4$, thus forming the armature-circuit. Tracing now the field-current: Beginning at the battery $V'$ $V^2$ and following over the wire $P'$ through the main case A, stem F, and switch-bar L, and to the brush $m$. From the brush $m$ the current follows to the plates $O^{11}$, $O^{12}$, $O^{13}$, or $O^{14}$, as the position of the lever H and consequent position of the bar L and brush $m$ may determine. If the brush $m$ rests on plates $O^{11}$ or $O^9$, then the current passes directly to the field-winding by way of the wire $P^5$; but if on plates $O^{12}$ $O^{13}$ $O^{14}$ or corresponding ones $O^8$ $O^7$ $O^6$, then the current must pass through varying resistance. (Shown at V in Fig. 1; also shown connected between the plates $O^9$ and $O^8$ and $O^7$ and $O^6$, Fig. 3.) This resistance inserted into the field-circuit, it will be understood, regulates the strength of the field-magnets, and consequently the speed of the armature. The weaker the field-magnets the higher the speed, and vice versa. After passing through the plates $O^{11}$ and $O^9$ or through the whole or some portion of the resistance-coils V the field-circuit then passes over the wire $P^5$ to the motor-field W, through this field to the wire $P^6$, connecting with wire $P^4$ at the junction X in Fig. 3, thence by the wire $P^4$ again to the negative poles of the battery $V'$ $V^2$. It will be understood without retracing these currents that by moving the pedal K, lever H, and switch-bar L to the position indicated by $T'$ in Fig. 2 the armature-current will be reversed accordingly, the field-current remaining in the direction that has been pointed out.

When the lever H and the switch-bar L are suddenly moved to their central or neutral position and the armature $Q^3$ is in rapid motion and would continue to revolve but for the fact that as soon as the brush $p$ reaches the plates $O^{17}$ and $O^{16}$, the armature is placed on short-circuit and the field-magnets are at full strength. Consequently it instantly comes to rest.

We are aware that short-circuiting an armature for sudden stop has been done before, but always in combination with a resistance in either the field or armature circuit and very often in both. In this instance we have so designed the electrical details that all addition of resistance is unnecessary and we get the full benefit of the dynamo effect. The direction of the current at the time of the short-circuit is as follows: When the brush $p$ has passed the plate $O^{18}$ or the plate $O^{15}$, as the case may be, it bridges over $O^{16}$ and $O^{17}$, this making a closed circuit on the armature and no connection with the battery $V'$ $V^2$, as we will now trace. Commencing at the brush $Q'$, through the wire $P^2$ to the binding-post S and plate $O^5$, then through the wire $P^7$ to the plate $O^{16}$, through the brush $p$ to the plate $O^{17}$, and through the wire $P^9$ to the plate $O'$, then through the binding-post $S^3$ and the wire $P^3$ back to the armature-brush $Q^2$, without resistance in the circuit. While the brush $p$ is passing over the central plates $O^{16}$ and $O^{17}$, and thereby closing the only gap between the two armature-terminals, the brush $m$ rests on the plate $O^{11}$ or $O^9$, and in this position the field-magnets are at full strength until the segment $O^{10}$ is reached, when no current flows and the armature is at rest. In this manner it will be seen that the armature $Q^3$ will be suddenly stopped without frictional or brake devices and the whole apparatus simplified, as well as better adapted to its purposes.

Having thus described the nature and objects of our invention and the manner of applying the same, what we claim as new, and desire to secure by Letters Patent, is—

1. In an electric-motor-controlling apparatus, the combination with the main containing-case, of a vertical spindle, a fixed switch-bar on said spindle, a series of contacts surrounding the spindle, contact-segments $O^{16}$ and $O^{17}$, whereby brush $p$ short-circuits the armature-terminals when approaching the central position.

2. In an electric-motor-controlling apparatus, the combination with the main containing-case, of a vertical spindle, a fixed switch-bar on said spindle, a series of contacts surrounding the spindle, contacts $O^9$ and $O^{11}$ of greater width than the adjoining ones, so that the field-magnets remain at full strength sufficiently long to bring the armature to a stop before brush $m$ reaches neutral segment $O^{10}$.

3. In an electric-controlling apparatus, an oscillating spindle, a fixed switch-bar on said spindle, connected brushes $m$ and $p$ and an insulated brush $n$ on said switch-bar, a series of contact-plates surrounding the spindle, and a lever for operating the spindle, so that when the lever is approaching its central or neutral position the field-magnets remain at full strength.

OSCAR H. PIEPER.
ALPHONSE F. PIEPER.

Witnesses:
F. F. CHURCH,
THOMAS DURANT.